US011288362B2

(12) United States Patent
Gordeychik et al.

(10) Patent No.: US 11,288,362 B2
(45) Date of Patent: *Mar. 29, 2022

(54) SYSTEM AND METHOD FOR CREATING ANTIVIRUS RECORDS FOR ANTIVIRUS APPLICATIONS

(71) Applicant: AO Kaspersky Lab, Moscow (RU)

(72) Inventors: Sergey V. Gordeychik, Moscow (RU); Sergey V. Soldatov, Moscow (RU); Konstantin V. Sapronov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 79 days.

This patent is subject to a terminal disclaimer.

(21) Appl. No.: 17/030,467

(22) Filed: Sep. 24, 2020

(65) Prior Publication Data

US 2021/0019398 A1 Jan. 21, 2021

Related U.S. Application Data

(63) Continuation of application No. 16/150,896, filed on Oct. 3, 2018, now Pat. No. 10,810,308.

(30) Foreign Application Priority Data

Feb. 6, 2018 (RU) ............................ RU2018104436

(51) Int. Cl.
*G06F 21/55* (2013.01)
*G06F 21/53* (2013.01)
(Continued)

(52) U.S. Cl.
CPC .............. *G06F 21/552* (2013.01); *G06F 9/54* (2013.01); *G06F 21/53* (2013.01); *G06F 21/566* (2013.01);
(Continued)

(58) Field of Classification Search
CPC .......... G06F 21/552; G06F 9/54; G06F 21/53; G06F 21/566; H04L 63/1425; H04L 63/1441; H04L 63/145
(Continued)

(56) References Cited

U.S. PATENT DOCUMENTS 6,622,150 B1 * 9/2003 Kouznetsov ............ G06F 21/56
6,965,928 B1 * 11/2005 Cox ....................... H04L 41/085
709/203

(Continued)

FOREIGN PATENT DOCUMENTS

CN 103824020 A * 5/2014 ........... G06F 21/562
CN 104200161 A * 12/2014 ............. G06F 21/53
(Continued)

OTHER PUBLICATIONS

Jamrozik et al., "Mining Sandboxes", IEEE, doi: 10.1145/2884781. 2884782, 2016, pp. 37-48. (Year: 2016).*
(Continued)

*Primary Examiner* — Peter C Shaw
(74) *Attorney, Agent, or Firm* — Arent Fox LLP; Michael Fainberg

(57) ABSTRACT

Disclosed are systems and methods for creating antivirus records for antivirus applications. An exemplary method includes: analyzing a log of records of API function calls of a file for presence of malicious behavior using one or more behavioral rules; determining that the file is malicious when a behavioral rule corresponding to one or more records of API function calls from the log is identified; extracting from the log the one or more API function calls associated with the identified behavioral rule; determining whether the one or more extracted records of API function calls are supported by an antivirus application of a user device; and when the one or more extracted records of API function calls are
(Continued)

not supported by the antivirus application, adding to the antivirus application, a support for registering the unsupported records of API function calls.

17 Claims, 6 Drawing Sheets

(51) Int. Cl.
*G06F 9/54* (2006.01)
*H04L 29/06* (2006.01)
*G06F 21/56* (2013.01)

(52) U.S. Cl.
CPC ........ *H04L 63/145* (2013.01); *H04L 63/1425* (2013.01); *H04L 63/1441* (2013.01)

(58) Field of Classification Search
USPC .......................................................... 726/22
See application file for complete search history.

(56) References Cited

U.S. PATENT DOCUMENTS

| | | | |
|---|---|---|---|
| 7,231,440 B1 * | 6/2007 | Kouznetsov | H04L 63/145 |
| | | | 709/224 |
| 8,832,836 B2 | 9/2014 | Thomas et al. | |
| 8,935,789 B2 * | 1/2015 | Shukla | G06F 21/567 |
| | | | 713/164 |
| 9,516,060 B2 | 12/2016 | Yu et al. | |
| 2008/0127336 A1 | 5/2008 | Sun et al. | |
| 2012/0260343 A1 | 10/2012 | Sun et al. | |
| 2012/0278892 A1 | 11/2012 | Turbin | |
| 2014/0130161 A1 * | 5/2014 | Golovanov | G06F 21/564 |
| | | | 726/23 |
| 2014/0181897 A1 | 6/2014 | Zaitsev | |
| 2016/0212156 A1 | 7/2016 | Choi et al. | |
| 2017/0093892 A1 | 3/2017 | Prokudin | |

FOREIGN PATENT DOCUMENTS

| | | | | |
|---|---|---|---|---|
| CN | 105760787 A | * | 7/2016 | ........... G06F 21/554 |
| CN | 106295336 A | * | 1/2017 | ............. G06F 21/00 |
| DE | 10126752 A1 | * | 12/2001 | ........... G06F 21/562 |
| JP | 2007189296 A | * | 7/2007 | |
| RU | 2583712 C2 | * | 5/2016 | ........... G06F 12/16 |
| RU | 2592383 C1 | * | 7/2016 | |
| WO | WO-2017028612 A1 | * | 2/2017 | |

OTHER PUBLICATIONS

Narvekar et al., "Security sandbox model for modern web environment", IEEE, doi: 10.1109/ICNTE.2017.7947885, 2017, pp. 1-6. (Year: 2017).*

Wray et al., Generic Security Service API Version 2: C-bindings (RFC2744), IP.com, IPCOM000003341D, Feb. 10, 2019 (Jan. 1, 2000), pp. 1-101. (Year: 2000).*

Josse, "Malware Dynamic Recompilation", IEEE, doi: 10.1109/HICSS.2014.624, 2014, pp. 5080-5089. (Year: 2014).*

Xu et al., "Polymorphic malicious executable scanner by API sequence analysis", IEEE, doi: 10.1109/ICHIS.2004.75, 2004, pp. 378-383. (Year: 2004).*

* cited by examiner

SYSTEM AND METHOD FOR CREATING ANTIVIRUS RECORDS FOR ANTIVIRUS APPLICATIONS

CROSS REFERENCE TO RELATED APPLICATIONS

The present application is a Continuation and claims benefit of U.S. application Ser. No. 16/150,896 filed on Oct. 3, 2018, which claims benefit of priority to Russian Application No. 2018104436, filed on Feb. 6, 2018, both of which are incorporated herein by reference.

FIELD OF TECHNOLOGY

The present disclosure relates to the field of computer security and, more specifically, to systems and methods for creating antivirus records for antivirus applications.

BACKGROUND

Traditional signature analysis has a low effectiveness for detecting malicious files, particularly polymorphic viruses, obfuscated files, and shellcodes.

Therefore, modern antivirus applications also utilize other technologies for detecting a malicious software. For example, a scan may use a so-called "sandbox." The sandbox refers to an environment that is specially isolated from the rest of the system. Access to and use of resources is limited for processes executed in the sandbox. A "sandbox" may be implemented, for example, on a virtual machine, on the basis of a partial virtualization of the file system and register, on the basis of access rules to the file system and register, or on the basis of a hybrid approach. The file being scanned is executed in the "sandbox". In the course of the execution of the file, records (i.e., information) as to the API function calls and system events (and also the data being analyzed, transmitted and received, as well as network connections, etc.) are stored in the call log (log of API function calls). The antivirus application further makes a search for behavioral rules (e.g., known patterns of malicious behavior) which are satisfied by the records of the obtained call log. The call log is used for keeping records of the API (application programming interface) function calls carried out by the file during its execution. An API function call or a procedure call (the command CALL, to call a procedure) is defined as an unconditional transfer of control for executing the procedure (API function) call. The command CALL carries out a memorization of the return address in the stack and a transfer to execute the API function. The information about the API function being called contains: the data being transmitted to the API function, the data being returned by the API function, the process calling the API function, the library/application/kernel providing the API function, the code of the API function, the address by which the API function is called, the address where the API function is located, the return address, and so forth. The call log also keeps information on the return commands (e.g., RET command, return from procedure) from the API functions called. Upon executing a return command from an API function, the return address is extracted from the stack and a transfer of control to the return address occurs. Typically, the execution of a file in a sandbox takes place within a limited span of time (up to several tens of seconds).

Another technology for detecting a malicious functional in a file is one which uses emulation. Emulation involves an imitating of the host system during the execution of a code in an emulator.

In modern antiviruses, the technologies, described above, are used together. Typically, first, a signature analysis is performed for the file. Then, if no malicious behavior is found during the signature analysis, the file is executed in an emulator or "sandbox" (execution in a "sandbox" is usually done on the part of the manufacturer of the antivirus software, in view of their greater computing capabilities). If no malicious functional is discovered during the execution in the emulator or sandbox, the file is transferred for execution on the computer of the user. However, there still remains a probability that a malicious functional was not discovered during the execution in the emulator or sandbox. To provide more effective protection, the execution of unknown files on a user's computer is done under the supervision of a behavioral analyzer (a proactive protector). The behavioral analyzer, by analogy with a "sandbox" and emulator, gathers and analyzes the call log of API functions in the course of the execution of the file on the user's computer. For the mentioned detecting technologies, the call logs and rules of behavior may have both common and individual records, due to differences in their working principles. The behavioral analyzer, making use of installed drivers/interceptors, intercepts the calls of the API functions being carried out during the execution of the malicious code and the return commands from the called API functions, and saves the intercepted calls and return commands in a call log. Then, the behavioral analyzer performs a search in the call log for behavioral rules (patterns of known malicious behavior) and pronounces a verdict (for example, a computer virus, a network worm, a Trojan horse program, or conditionally unwanted software). The principle of analysis of the call log by the behavioral analyzer is similar to the working of the "sandbox" and emulator. However, the behavioral analyzer has no limits on the file execution time. The behavioral analyzer is different in other regards. For example, the detection and bypass techniques of the emulator and "sandbox" do not work for the behavioral analyzer because the file is executed on the user's computer and not in an isolated environment or in an emulator. The user's computer may be executing its payload while the behavioral analyzer is executing the file. Therefore, a malicious file may harm the system before being detected and neutralized by the behavioral analyzer.

In order to perform a more careful analysis, the "sandbox" is usually located on a server having greater computing capabilities and a longer time for execution of the file being investigated. Unknown suspicious files arriving at an antivirus company are analyzed in a "sandbox". If the analysis identifies a behavior that corresponds to a behavioral rule, the file is pronounced as being malicious. Then, an analyst may create an antivirus record or a behavioral rule for detecting this file by a protector (protection module, e.g. antivirus) on the computing device of the user—for example, the analyst may update: an antivirus record for signature analysis, a behavioral rule for a behavioral analyzer, or a behavioral rule for an emulator. However, a significant interval of time may pass between the detecting of a malicious file on a virtual machine and the creation of an antivirus record for an antivirus application (i.e., a protector of a computing device) by an analyst. Thus, the technical problem to be solved is to create timely antivirus records for the protector of a computing device on the basis of an identified behavioral rule corresponding to the records of the call log of a virtual machine ("sandbox").

SUMMARY

Disclosed are systems and method for creating antivirus records. In one exemplary aspect, a system is provided for creating antivirus records, the system comprising a hardware processor of a protector against targeted attacks configured to: analyze a log of API function calls of a file for presence of malicious behavior using one or more behavioral rules, determine that the file is malicious when a behavioral rule corresponding to records of a log of API function calls is identified, extract one or more records of API function calls associated with the identified behavioral rule, determine whether at least one extracted record of the API function calls can be registered by a protector of a computing device, and when the at least one extracted record of the API function calls can be registered by the protector of the computing device, create an antivirus record for the protector of the computing device, wherein the created antivirus record includes at least the extracted records of the API function calls.

In one exemplary aspect, a method is implemented in a computer comprising a hardware processor, the method comprising: analyzing a log of API function calls of a file for presence of malicious behavior using one or more behavioral rules, determining that the file is malicious when a behavioral rule corresponding to records of a log of API function calls is identified, extracting one or more records of API function calls associated with the identified behavioral rule, determining whether at least one extracted record of the API function calls can be registered by a protector of a computing device, and when the at least one extracted record of the API function calls can be registered by the protector of the computing device, creating an antivirus record for the protector of the computing device, wherein the created antivirus record includes at least the extracted records of the API function calls.

In one exemplary aspect, when the protector of the computing device does not support the registering of the at least one extracted record of the API function calls, the method further comprise adding to the protector of the computing device support for the registering of unsupported records of the API function calls.

In one exemplary aspect, the method further comprises, creating the antivirus record for the protector of the computing device after the addition of the support. The created record consists of the extracted records of the API function calls.

In one exemplary aspect, when the protector of the computing device does not support the registering of the at least one extracted record of the API function calls, the method further comprises creating the antivirus record for the protector of the computing device when the percentage of the supported records of the API function calls as compared to a number of all records of API function calls contained in the behavioral rule is greater than a predetermined threshold. The created record including only the supported records of the API function calls.

In one exemplary aspect, the analysis of the file on the protector against targeted attacks includes at least one of: a check with the use of the reputation service, a check with the use of the YARA rules, or an expert analysis.

In one exemplary aspect, the protector against targeted attacks includes a sandbox, and the log of API function calls is populated by executing processes launched from the file in the sandbox.

In one exemplary aspect, the sandbox is realized on at least one of: a virtual machine, a basis of a partial virtualization of a file system and a register, and a basis of access rules to the file system and register.

The above simplified summary of exemplary aspects of the present disclosure serves to provide a basic understanding of the teachings of the present disclosure. The summary is not an extensive overview of all contemplated aspects, and is intended to neither identify key or critical elements of all aspects nor delineate the scope of any or all aspects of the teachings of the present disclosure. To the accomplishment of the foregoing, the one or more aspects of the present disclosure include features described and exemplarily pointed out in the claims.

As described above, the antivirus record is created in accordance with the teachings of the present disclosure, advantageously improving protection of a computing device.

In addition, the number of identifiable malicious files is increased. For example, by creating an antivirus record for the protection module of a computing device on the basis of an identified behavioral rule corresponding to the records of the call log of a virtual machine, the number of identifiable malicious files is increased.

In yet another advantage, the time for creating the antivirus record is shortened, as compared to times associated with other approaches. For example, by creating an antivirus record for the protector on the basis of an identified behavioral rule corresponding to the records of the call log of a virtual machine, the duration of time needed for creating the antivirus record is advantageously shortened.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for the creation of antivirus records. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary

In order to add clarity, terms used in describing one or more exemplary aspects of the present disclosure are first provided herein.

Indicators of compromise (IOC, less often, indicators of infection) are artifacts or residual signs of an intrusion in an information system, observable on a computer or in a network. Typical indicators of compromise are antivirus records, IP addresses, check sums of files, URL addresses, domain names of botnet command centers, and others. A number of standards exist for indicators of compromise, in particular:

OpenIOC (http://blogs.rsa.com/understanding-indicators-of-compromise-ioc-part-i/, http://openioc.org/), STIX (https://stix.mitre.org/), CybOX (https://cybox.mitre.org) and others.

Computer attack (also cyber-attack) is a targeted action on information systems and information telecommunication networks by software and hardware, carried out for the purpose of breaching the security of the information in these systems and networks.

Targeted attack (TA) is a particular case of a computer attack targeted against a particular organization or a particular individual.

Fuzzy hash or flexible fingerprint (locality sensitive hash) is a file fingerprint which is stable to changes in the file from which it is formed. That is, upon detecting a malicious file, the value of its fingerprint will also be used to detect many similar (possibly unknown) malicious files. The chief feature of such a fingerprint is its invariance to minor file changes; see, for example, patent number U.S. Pat. No. 8,955,120.

Fuzzy verdict is a response of a protector (antivirus application) upon detecting suspicious actions during a file execution, such as a verdict that indicates that the file has characteristic of a malicious file. A fuzzy verdict is triggered, for example, upon detecting a file with the aid of a flexible fingerprint. The fuzzy verdict indicates that the file that is detected is malicious and also provides a certain degree of probability for the verdict.

Figure 1:
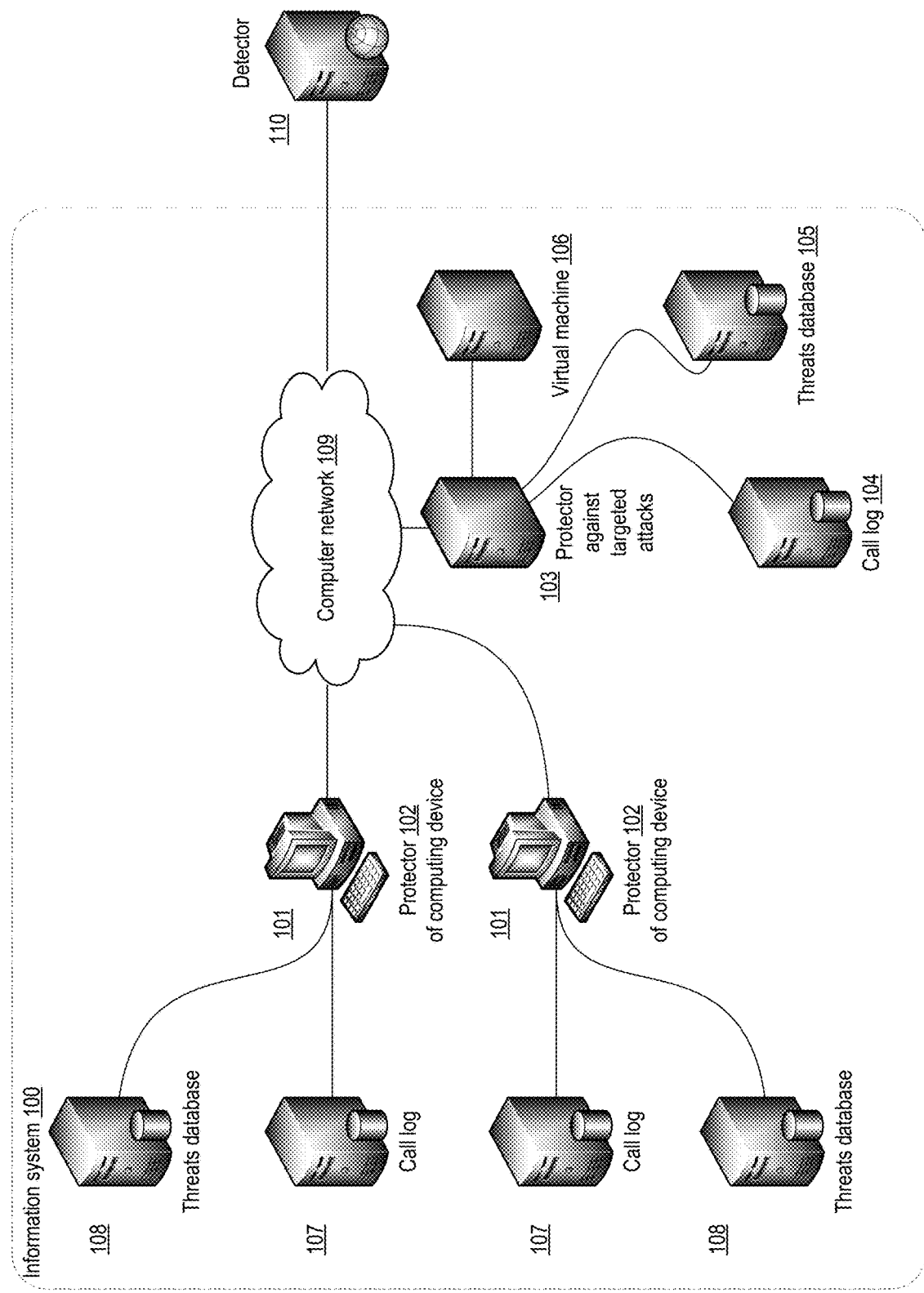
FIG. 1 illustrates an information system used for the creation of antivirus records in accordance with the teachings of the present disclosure.

Returning to the description of the teachings of the present disclosure, FIG. 1 illustrates an information system used for the creation of an antivirus record in accordance with the teachings of the present disclosure. The information system 100 includes at least one computing device 101 (also a computer, for short), communicatively coupled to a computer network 109. The computing device 101 comprises a standard computing device, e.g., a personal computer, a notebook, a smartphone, a network equipment (e.g., a router, a switch, a hub), and so forth. It should be noted that the computing device 101 may be either a physical device or software operating on a physical device—such as a virtual machine. The information system 100 may be organized with the use of any network topology 109 ordinarily known in the art, such as one of the following types: fully connected, bus, star, ring, cellular or mixed type network topologies.

On the computing device 101, a protector 102 (protection module) of the computing device may be installed. It should be noted that if the information system 100 contains two or more computing devices 101, a protector 102 might not be installed on some of the computing devices 101.

The information system 100 further includes a protector against targeted attacks 103, which may be located, for example, on a separate server. The separate server may be connected to at least one computing device 101 through the computer network 109. Proxy servers (not shown) may be used for the connecting of the computing devices 101 to the Internet and to a detector 110, through the network 109. The protector against targeted attacks 103 may contain: a threats database 105, a call log 104, and a virtual machine 106, which are described below in further detail.

The system further includes at least one computing device 101 with a protector 102 running on the computing device 101 (as an example, FIG. 1 shows two protectors 102, one running on each computing device 101).

The protector 102 may contain a call log 107 of the computing device 101 and a threats database 108. The modules of the protector 102 (for more details see FIG. 3), such as an emulator, a behavioral analyzer, and others, may register records on API function calls during the execution of an investigated file in the call log 107 (such as the function name, the parameters transmitted, the time of the function call).

In an exemplary aspect, each record of the call log 107 for API function calls contains the following information:

an identifier (such as the name) of the function called;

a unique identifier of the process (process identifier, PID) launched from that file;

a unique identifier of the thread (thread identifier, TID) executing the instructions of the address space of the process;

a set of arguments of the mentioned function; and the time of the function call.

The antivirus record for a protector 102 may be defined as a signature and/or a rule for the corresponding protector 102, such as the antivirus record of an on-access scanner, a behavioral rule for a behavioral analyzer, or a behavioral rule of an emulator. In the case of a signature, the antivirus record may constitute, for example, the hash sum of a segment of the file code, a set of hash sums from different segments of the file code and rules for selecting those hash sums (for example, if two out of three hash sums contained in the signature are encountered, it is considered that the entire signature is encountered), and so on. Examples of behavioral rules for a behavioral analyzer and emulator are presented below.

The detector 110 (detection module) may be situated on a remote server, which is connected to the protectors 102-103 via the computer network 109, and is used to perform a more detailed analysis of files.

Figure 2:
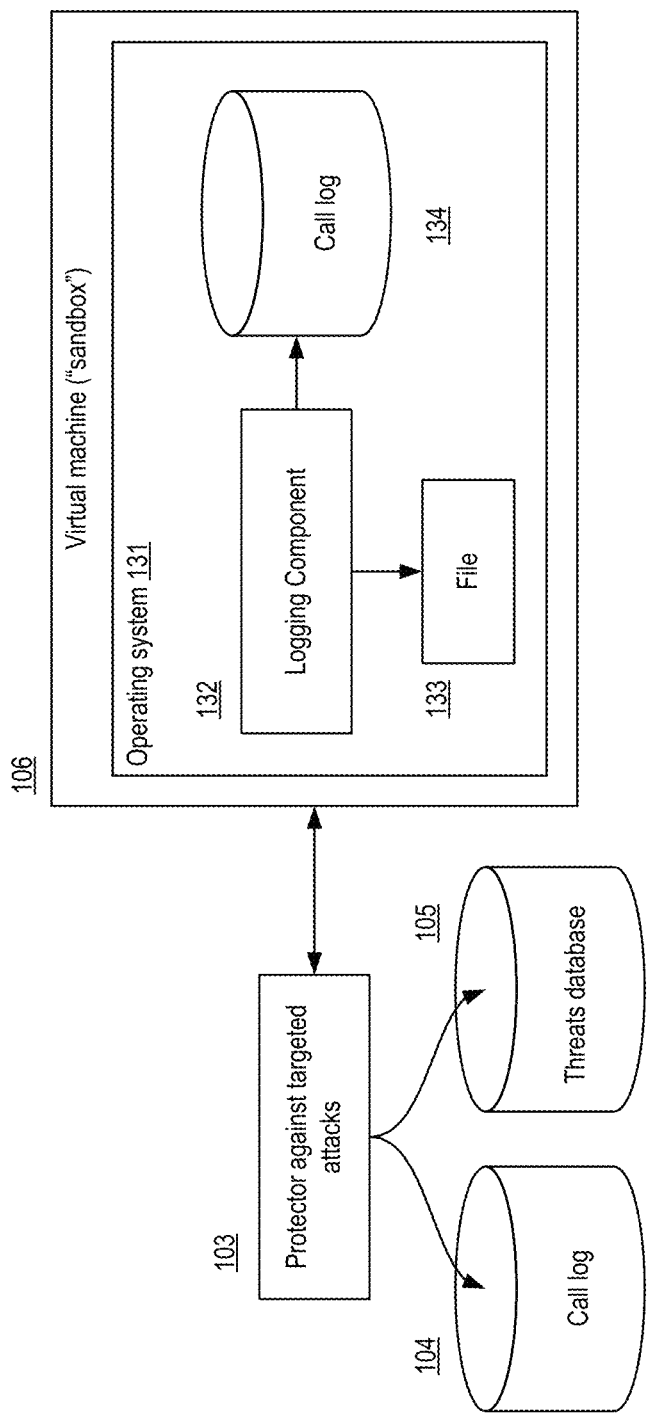
FIG. 2 is a block diagram illustrating an exemplary "sandbox".

FIG. 2 is a block diagram illustrating an exemplary "sandbox". The "sandbox" constitutes a computer environment for the safe execution of processes. In an exemplary aspect of the present disclosure, the "sandbox" may be realized, for example, in the form of a virtual machine, on the basis of a partial virtualization of the file system and register, on the basis of access rules to the file system and register, or on the basis of a hybrid approach. FIG. 2 shows a sample realization of a "sandbox" in the form of a virtual machine 106, on which an Operating System (OS) 131 is installed. The virtual machine 106 is designed to execute a file 133 under the control of a protector against targeted attacks 103. It should be noted that the file 133 may be a file of any given data format and may contain any given data.

During the execution of the file 133, a logging component 132 contained in the virtual machine 106 intercepts the API function calls and enters records about the API function calls in succession. The records are entered in a call log 134, which is likewise located in the virtual machine 106. The call log 134 of the virtual machine contains records on at least the API function calls registered during the execution of the file on the virtual machine.

An API function call or a procedure call (the command CALL, to call a procedure) is defined as an unconditional transfer of control executing the procedure (API function) call. The command CALL carries out a memorization of the return address in the stack and a transfer to execute the API function. The information about the API function being called contains: the data being transmitted to the API function, the data being returned by the API function, the process calling the API function, the library/application/kernel providing the API function, the code of the API function, the address by which the API function is called, the address where the API function is located, the return address, and so forth. The call log also keeps information on the return commands (RET command, return from procedure) from the API functions called—upon executing a return command from an API function, the return address is extracted from the stack and a transfer of control to this address occurs. The execution of a file in a sandbox usually takes place within a limited span of time (up to several tens of seconds).

In an exemplary aspect, each record of the call log 134 (and, accordingly, of the call log 104) for API function calls contains the following information:
- an identifier (such as the name) of the function called;
- a unique identifier of the process (process identifier, PID) launched from that file 133;
- a unique identifier of the thread (thread identifier, TID) executing the instructions of the address space of the process; and
- a set of arguments of the mentioned function.

In yet another exemplary aspect, during the execution of the file 133 on the virtual machine 106, the following information is additionally registered:
- commands for the transfer of control to a return address from API functions;
- direct Windows NT Native API function calls;
- commands for return from Windows NT Native API functions;
- the method of changing the state of the computer system, in particular the event of shutdown or rebooting of the computer system;
- events in the operating system;
- indicators of compromise;
- system calls;
- verdicts of the protector;
- the check sum of a file or the check sum of part of a file;
- the source of the file;
- the results of emulation of the file execution;
- the time of appearance of the file on the computing device;
- the data obtained by the file via the network;
- the data transmitted by the file via the network;
- DNS hijacking on the computer;
- disconnecting of automatic updating of the operating system;
- disconnection of the firewall;
- disconnection of the protector;
- disconnection of the "User Account Control" component;
- disconnection of the "system restore" component of the operating system;
- disconnection of the "show hidden files, folders and disks" option in the file manager;
- changing of the rules of the firewall;
- changing of the hosts file; and
- deletion of a file by itself.

The behavioral rule and the antivirus record additionally include the above indicated information.

The execution of the file 133 on a virtual machine 130 is completed if one of the following exit conditions occurs:
- the process is completed;
- the specified period of time has elapsed;
- the previous steps have been carried out for a given number of repetitions (such as 3); and
- the number of instructions executed by the process exceeds a given threshold for the number of instructions (such as 100000 instructions).

If the exit condition is fulfilled, i.e., the execution of the file 133 has been completed on the virtual machine 106, the protector 103 saves the records of the call log 134 that is contained in the virtual machine, wherein the records are saved in the call log 104 that is contained in the operating system in which the protector 103 is running.

In yet another exemplary aspect, the logging component 132 intercepts and enters into the call log 134 records containing information about the system calls responsible for the operation of working with the network, the register, the file system, the RAM, the processes and the threads.

It should be noted that when the logging component 132 intercepts API function calls, the logging component 132 has access to the call stack and to the instructions being executed on the processor. In another exemplary aspect, the logging component 132 saves in the call log 134 records on the exceptions and the instructions being executed on the processor.

In yet another exemplary aspect, the logging component 132 is designed to identify the following exceptions:
- violation of access rights when executing the call instruction;
- violation of access rights when writing to memory;
- violation of access rights when reading from memory at the address of the command counter, and also at addresses which coincide with the address of the command counter with a given accuracy;
- violation of the data execution prevention policy;
- buffer overflow on stack;
- dynamic memory corruption (heap corruption); and
- an attempt to carry out a forbidden, incorrect or privileged instruction.

For example, the logging component 132 may identify the exception of "violation of access rights when writing to memory" upon analysis of the contents of the register, system structures, and call stack upon intercepting the API function call KiUserExceptionDispatcher.

The protector 103 is designed to identify a behavioral rule corresponding to records of the call log 104 among the behavioral rules which are contained in the threats database 105. The behavioral rule includes information on the calling of at least one API function and a verdict (for example, a computer virus, Internet worm, Trojan horse program or conditionally unwanted software) in the event that the behavioral rule is triggered. In an exemplary aspect, the behavioral rules consist a set of API function calls and logical expressions about the set of API function calls. For example, if certain API functions have been called with certain parameters, as specified by a behavioral rule, the protector 103 may find the behavioral rule in the call log 104. In another exemplary aspect, the behavioral rule may additionally contain conditions imposed on other records of this same behavioral rule. Such conditions might be, for example, the checking of the number of records of the antivirus record, the checking of the order of succession of the records of the antivirus record, and so forth.

Thus, behavioral rules are used in both the behavioral analyzer and in the "sandbox" when executed on a virtual machine and on an emulator. The differences in the behavioral rules may involve information about the API function calls and the conditions imposed on the API function calls. For example, the behavioral analyzer may register records on API function calls from a list which may differ entirely or partly from the list of API function calls which can be registered by the virtual machine or emulator. At the same time, in another exemplary aspect, said lists of API function calls of the behavioral analyzer, virtual machine, and emulator may coincide.

Figure 3:
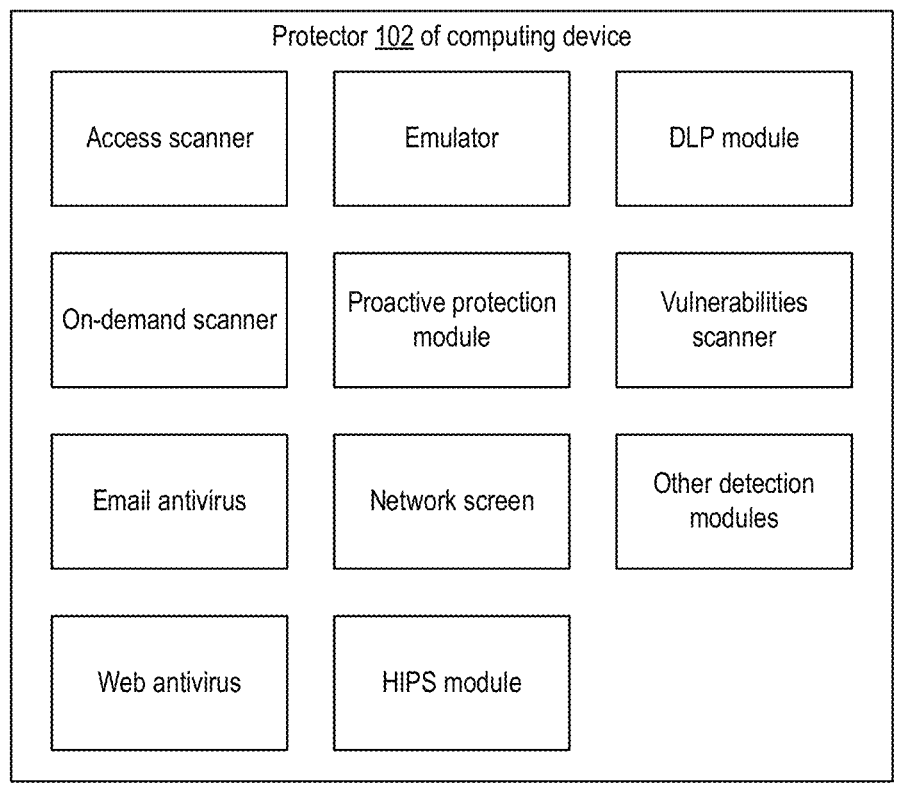
FIG. 3 illustrates an exemplary block diagram of a protector of a computing device.

FIG. 3 illustrates an exemplary block diagram of a protector of a computing device. In turn, the protector 102 of the computing device may contain several modules (specific modules) designed to ensure information security of the computing device 101: an on-access scanner, an on-demand scanner, an email antivirus, a web antivirus, a behavioral analyzer (proactive protection module), a HIPS module (Host Intrusion Prevention System), a Data Loss Prevention (DLP) module, a vulnerabilities scanner, an emulator, a firewall, and others. In an exemplary aspect of the present disclosure, these specific modules may be an integral part of the protector 102. In yet another exemplary aspect, these modules may be realized in the form of separate program components.

The on-access scanner contains a program for detecting malicious activity of all files being opened, launched and saved on the computer system of the user. The on-demand scanner differs from the on-access scanner in that it scans files and directories indicated by the user, i.e., on demand by the user.

The email antivirus is used to check whether an incoming and/or outgoing email contains malicious files. The web antivirus serves to prevent: the execution of a malicious code which may be contained on web sites visited by the user, and to block the opening of the web sites. The HIPS module serves to detect unwanted and malicious activity of programs and to block such activities at the time of execution. The DLP module serves to detect and prevent the loss of confidential data from a computer or network. The vulnerabilities scanner is needed to detect vulnerabilities on the computing device 101 (for example, certain components of the protector 102 have been turned off, obsolete virus databases, a network port has been closed, and so on). The firewall provides checking and filtering of network traffic in accordance with specified rules. The emulator is tasked with imitating the host system during the execution of the code in the emulator. The behavioral analyzer uses behavioral rules to detect the behavior of files being executed and to classify them by levels of trust—in the process of file execution, the behavioral analyzer performs a search in the call log 107 of at least registered records on API function calls which correspond to behavioral rules from a threats database 108. In a particular exemplary aspect, the call log 107 and the threats database 108 are located on the computing device 101.

A behavioral rule includes a record on the calling of at least one API function and a verdict (such as a computer virus, an Internet worm, a Trojan horse program, or conditionally unwanted software), in the event that this rule is triggered. In another exemplary aspect, the behavioral rules consist: a set of API function calls and logical expressions about the set of API function calls. For example, if certain API functions have been called with certain parameters as specified by the behavioral rule, the protector 102 may find the behavioral rule in the call log 107.

The behavioral rule also corresponds to a verdict which is pronounced upon the triggering of this rule—that is, the most likely category of the malicious or unwanted software corresponding to that behavioral rule. For example, the verdict might be the following: a computer virus, an Internet worm, a Trojan horse program, or conditionally unwanted software.

In another exemplary aspect, the behavioral rules (of the behavioral analyzer, emulator and "sandbox") include at least one of the following:
  the call of an API function from a list of suspicious API functions (for example, the list may contain the following API functions: WinExec, CreateProcess, GetFileSize, CreateFile);
  the call of the API function GetFileSize has been performed 10 times;
  the call of the API function WriteFile (writing to file) is followed by the call of the API function WinExec (launching a file for execution);
  DNS hijacking on the computer;
  disconnecting of automatic updating of the operating system;
  disconnecting of the firewall;
  disconnecting of the protector; and
  disconnecting of the UAC (User Account Control, a component of the Windows OS).

The indicated modules of FIG. 3, upon detecting a malicious software (suspicious behavior, spam, and other signs of a computer threat) create a corresponding notification (which may then be transformed into a verdict of the protector 102) informing the protector about the detected threat and the need to perform actions to remove the threat (for example, remove or modify the file, forbid execution, and so on). In another exemplary aspect, the protector itself—having detected the malicious software—may perform the actions to remove the threat. In yet another exemplary aspect, the verdict may be a fuzzy or a trial verdict (since said verdict might produce false alarms)—in this case, the protector will not perform actions to remove the threat, but rather passes the notification on to a remote server (not indicated in the figure). In another exemplary aspect, a malicious software includes the following categories (the verdict corresponding to the category)—malicious software and conditionally unwanted software. The malicious software may have subcategories—viruses, worms, Trojan horse programs, packers, malicious utilities. Conditionally unwanted software is advertising software (adware), software involving pornographic content (pornware), legal software whose use may cause harm to the computer (riskware), and others.

Figure 4:
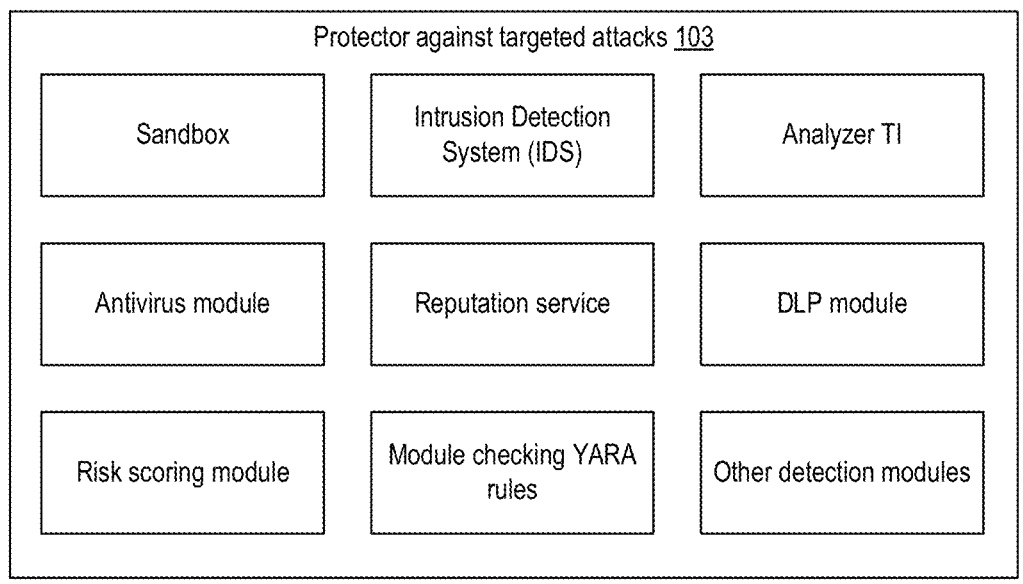
FIG. 4 illustrates an exemplary block diagram of a protector for protecting against targeted attacks.

FIG. 4 illustrates an exemplary block diagram of a protector for protecting against targeted attacks, "protector against targeted attacks." The protector against targeted attacks 103, situated on a server, may contain for example the following modules: a "sandbox", an Intrusion Detection System (IDS), a reputation service, a module for checking of YARA rules, an antivirus module, a risk scoring module, an analyzer, a DLP module, and other detectors.

The "sandbox" module has a function similar to the emulator of the protector 102 of the computing device, described above, with the difference that the "sandbox" may use additional computing capabilities and work for a longer time. The protector against targeted attacks 103 has no time limits. In contrast, the time limits are inherent in the protector 102 of the computing device.

The "sandbox" is a computer environment for the safe execution of processes and serves to determine suspicious activity during the execution of a process launched from a file.

The "sandbox" may be realized, for example, in the form of a virtual machine (see the exemplary aspect shown in FIG. 2), on the basis of a partial virtualization of the file system and register, on the basis of access rules to the file system and register, or on the basis of a hybrid approach.

The intrusion detection system is a module of identifying: unauthorized access to a computing device 101 or network 109 or unauthorized control of the computing device 101 or the network 109.

The reputation service may contain information on the popularity of the files on computing devices 101 (the number of computing devices 101 having the file, the number of file launches, and so on).

The module for checking of YARA rules serves to check YARA signatures—an open signature format (see http://yararules.com/).

The DLP module serves to detect and prevent loss of confidential data from a computer or network.

The protector against targeted attacks 103, located on a server, sends to the logging component 132 a file 133 being investigated for execution in a virtual machine 106. During the execution of the file 133, the logging component 132 registers in the call log 134 at least records as to the API function calls (for example, the name of the function, the parameters being transmitted, the time of the function call). Thus, the call log 134 of the virtual machine will contain at least records on the API function calls registered during the execution of the file 133 on the virtual machine 106. As was described above, after completing the execution of the file 133 on the virtual machine 106, the protector 103 saves the records of the call log 134 contained in the virtual machine in the call log 104.

The present invention begins working in the event that a behavioral rule has been identified from the threats database 105 that corresponds to the records of the call log 104—i.e., a malicious file has been detected with the aid of the virtual machine.

Just like the behavioral rule for the behavioral analyzer, the behavioral rule for the virtual machine also includes information about at least one API function call and its verdict (for example, a computer virus, an Internet worm, a Trojan horse program, or conditionally unwanted software), in the event that this rule is triggered. In one exemplary aspect, the behavioral rules consist in particular of a set of API function calls and logical expressions about them. For example, if certain API functions have been called with certain parameters as specified by a behavioral rule, the protector 103 will find that rule in the call log 104.

The behavioral rule also corresponds to a verdict which is pronounced when this rule is triggered—that is, the most likely category of the malicious or unwanted software corresponding to that rule. The verdict may be, for example, the following: a computer virus, an Internet worm, a Trojan horse program, or conditionally unwanted software.

In one exemplary aspect, the behavioral rules include the following:
- the call of an API function from a list of suspicious API functions (for example, the list may contain the following API functions: WinExec, CreateProcess, GetFileSize, CreateFile);
- the call of the API function GetFileSize has been performed 10 times;
- the call of the API function WriteFile (writing to file) is followed by the call of the API function WinExec (launching a file for execution);
- DNS hijacking on the computer;
- disconnecting of automatic updating of the operating system;
- disconnecting of the firewall;
- disconnecting of the protector; and
- disconnecting of the UAC (User Account Control, a component of the Windows OS).

Figure 5:
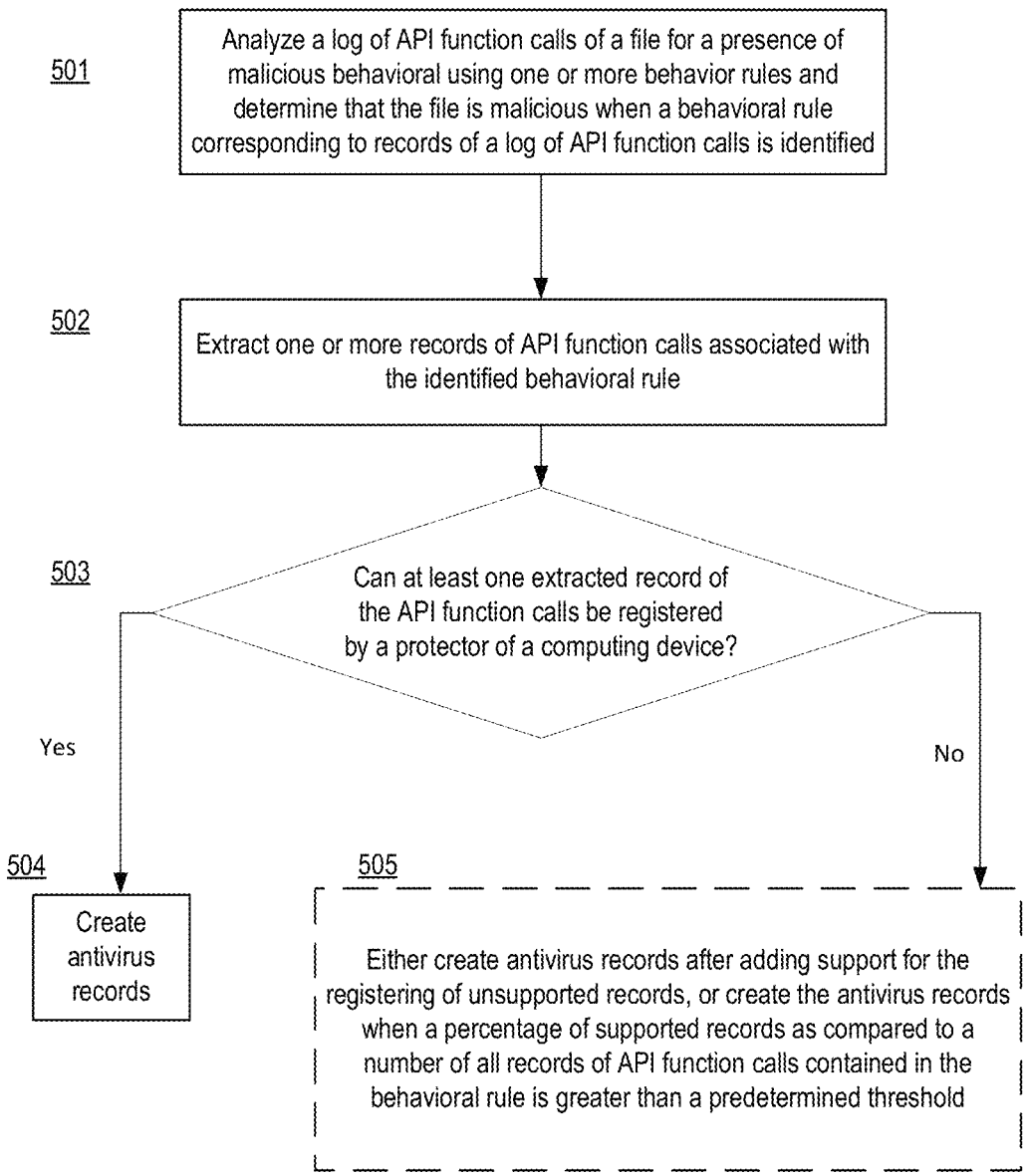
FIG. 5 illustrates a flow diagram for a method of creating an antivirus record in accordance with the teachings of the present disclosure.

FIG. 5 illustrates a flow diagram of a method of creating an antivirus record in accordance with the teachings of the present disclosure. According to one aspect of the present disclosure, in step 501, the method determines that a file is malicious by: analyzing a log of API function calls of the file for a presence of malicious behavior using one or more behavioral rules, and determining that the file is malicious when a behavioral rule corresponding to records of a log of API function calls is identified. For example, a file 133, as shown in FIG. 2, is determined as being malicious, when behavioral rules corresponding to records of the API function calls are identified. For instance, a log of API function calls of the file are examined to determine whether or not at least one malicious behavior (i.e., at least one of the one or more behavior rules) is present. In step 502, the method extracts one or more records of API function calls associated with the identified behavioral rule. The method then proceeds to step 503. In step 503, the method determines whether at least one extracted record of the API function calls is registered by a protector of the computing device. The determination is performed using the protector against targeted attacks. When the at least one extracted record of the API function calls is registered by the protector of the computing device, the method proceeds to step 504. Otherwise, the method proceeds to optional step 505. In step 504, the method creates an antivirus record for the protector 102 of the computing device, when the at least one extracted record of the API function calls can be registered. The created antivirus record includes at least the extracted records of the API function calls. In one aspect, the created antivirus record includes the extracted records on the API function calls. In step 505, the method either creates antivirus records after adding support for the registering of unsupported records, or creates the antivirus records when a percentage of supported records as compared to a number of all records of API function calls contained in the behavioral rule is greater than a predetermined threshold.

Thus, by creating an antivirus record for the protector 102, the stated technical problem is solved. Namely, the quality of detection of a malicious file is improved because the created antivirus record for the protector 102 makes it possible to detect malicious files which could not previously be detected on account of the absence of a corresponding antivirus record. The time for creating the antivirus record for the protector 102 will also be shortened, as compared to times associated with previously known methods.

In one aspect, the behavioral rule is created for the detector 110 which is situated on a remote server. In another aspect, the antivirus record is created for the protector 102 instantiated on the computing device 101. In yet another aspect, the antivirus record refers to one or more signatures and/or one or more rules for the corresponding protector 102. In yet another aspect, the antivirus record may comprise record of: an on-access scanner, a behavioral rule for a behavioral analyzer, or a behavioral rule for an emulator.

In one aspect, the analysis of the file on the protector against targeted attacks includes at least one of: a check with the use of the reputation service, a check with the use of the YARA rules, or an expert analysis. The expert analysis may a manual analysis of the file by an expert in the field of computer security.

In another aspect, if the protector 102 (installed on the computing device 101) does not support the registering of the at least one extracted record on an API function call, support is added to the protector 102 for the registering of unsupported records on API function calls. After the support is added, the antivirus record is created for the protector 102 that consists of the extracted records on the API function calls. For example, in the virtual machine 106 the logging component 132 may support the registering of a record on the API function call GetFileSize, however, the behavioral analyzer of the protector 102 on the computing device 101 may not support the registering of this function call. Yet the behavioral rule contains a record of the mentioned API function call (for example, the behavioral rule is as follows: "API function call GetFileSize was performed 10 times"). Therefore, support is added to the protector 102 for the registering of a record on the API function call GetFileSize. Then, the antivirus record is created for the protector 102 (in the given example, a behavioral rule for the behavioral analyzer) which consists of extracted records on API function calls.

In yet another exemplary aspect, if the protector 102 (installed on the computing device 101) does not support a registration of the at least one extracted record on an API function call, the antivirus record may be created including only the supported records on the API function calls. In one aspect, the antivirus record is created including only the supported records on the API function calls when the percentage of the supported records on API function calls as compared to the number of all records on API function calls which are contained in the behavioral rule is greater than a given number (such as 75%). As an example, let us assume that the following behavioral rule has been triggered: "a call of the following API functions from the list of suspicious API functions: WinExec, CreateProcess, GetFileSize, CreateFile, a call of the API function WriteFile is followed by a call of the API function WinExec". Suppose also that the protector 102 supports the registering of the API function calls WinExec, CreateProcess, CreateFile, WriteFile, but does not support the registering of the record on the API function call GetFileSize. For this scenario, the percentage of supported API functions from the number of all API functions contained in the triggered behavioral rule is 80%, which is greater than 75% (the example of the given number), so that the antivirus record may be created.

Figure 6:
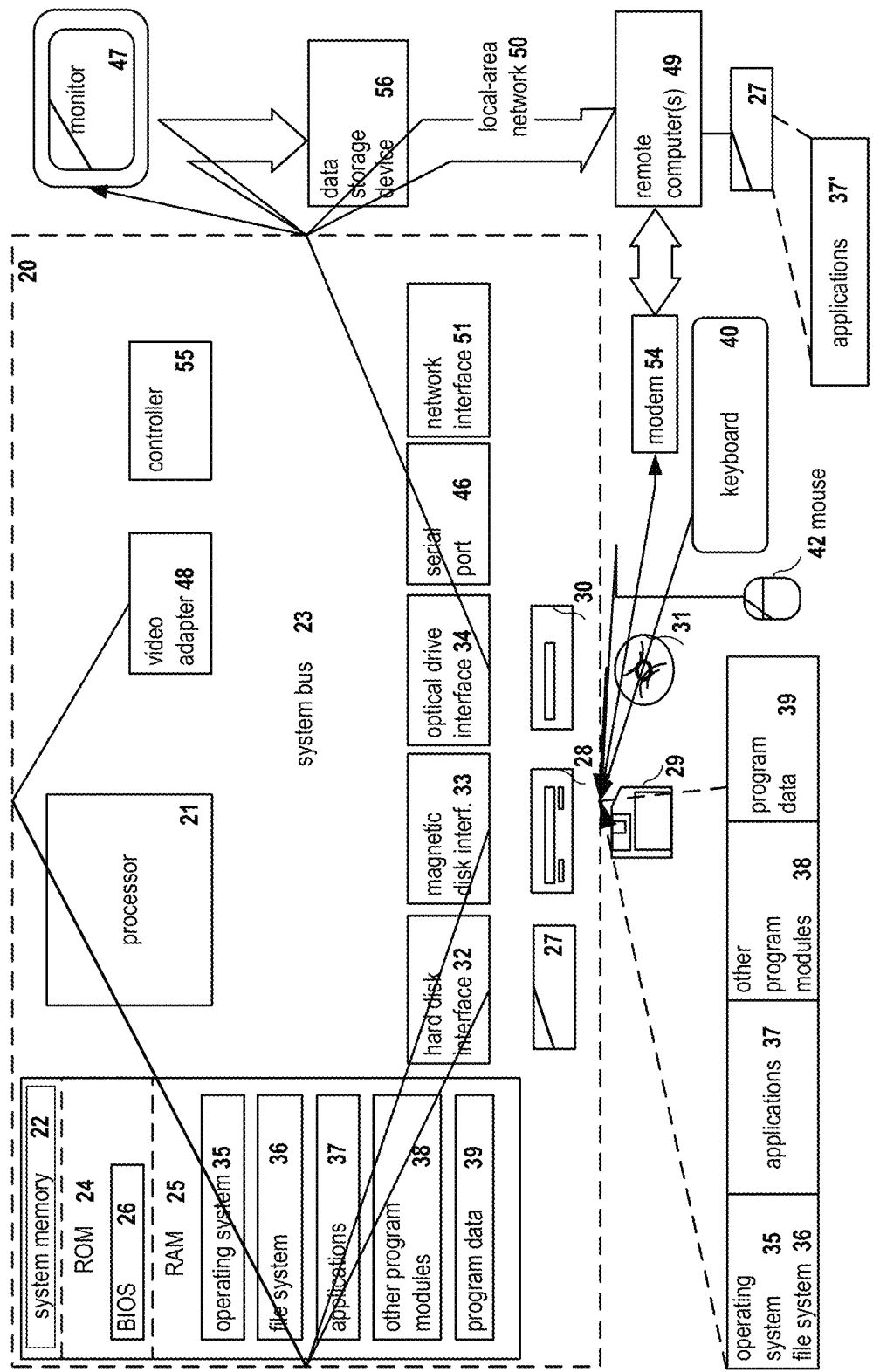
FIG. 6 presents an example of a general-purpose computer system on which aspects of the present disclosure can be implemented.

FIG. 6 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of updating antivirus applications with antivirus records, the method comprising: analyzing, by a processor, a log of records of API function calls of a file for presence of malicious behavior using one or more behavioral rules; determining, by the processor, that the file is malicious when a behavioral rule corresponding to one or more records of API function calls from the log is identified; extracting from the log, by the processor, the one or more API function calls associated with the identified behavioral rule; determining, by the processor, whether the one or more extracted records of API function calls are supported by an antivirus application of a user device; and when the one or more extracted records of API function calls are not supported by the antivirus application, adding, by the processor, to the antivirus application, a support for registering the unsupported records of API function calls; and creating a new antivirus record comprising the extracted one or more API function calls, a set of hash sums from different segments of the file and rules for selecting the set of hash sums.

2. The method of claim 1, further comprising: providing, by the processor, the new antivirus record to the antivirus application.

3. The method of claim 1, wherein the processor includes a sandbox, and the log of API function calls being populated by executing processes launched from the file in the sandbox.

4. The method of claim 3, wherein the sandbox is realized on at least one of: a virtual machine, a partial virtualization of a file system and a register, and access rules to the file system and the register.

5. The method of claim 1, wherein each record of the API functions call log comprises at least an identifier of the API function called, an identifier of the process launched from the file; an identifier of a thread executing instructions of the address space of the process; a set of arguments of the API function called.

6. The method of claim 1, wherein the behavioral rule corresponds to a verdict which is pronounced upon triggering of the rule, the verdict indicating a category of the malicious behavior corresponding to that behavioral rule.

7. The method of claim 1, wherein the analysis of the file by the processor includes at least one of: a check with the use of the reputation service, a check with the use of one or more YARA rules, or an expert analysis.

8. A system of updating antivirus applications with antivirus records, comprising: at least one processor configured to: analyzing a log of records of API function calls of a file for presence of malicious behavior using one or more behavioral rules; determining that the file is malicious when a behavioral rule corresponding to one or more records of API function calls from the log is identified; extracting from the log the one or more API function calls associated with the identified behavioral rule; determining whether the one or more extracted records of API function calls are supported by an antivirus application of a user device; and when the one or more extracted records of API function calls are not supported by the antivirus application, adding to the antivirus application a support for registering the unsupported records of API function calls; and creating a new antivirus record comprising the extracted one or more API function calls, a set of hash sums from different segments of the file and rules for selecting the set of hash sums.

9. The system of claim 8, wherein the processor further configured to: provide the new antivirus record to the antivirus application.

10. The system of claim 8, wherein at least one processor includes a sandbox, and the log of API function calls being populated by executing processes launched from the file in the sandbox.

11. The system of claim 10, wherein the sandbox is realized on at least one of: a virtual machine, a partial virtualization of a file system and a register, and access rules to the file system and the register.

12. The system of claim 8, wherein each record of the API functions call log comprises at least an identifier of the API function called, an identifier of the process launched from the file; an identifier of a thread executing instructions of the address space of the process; a set of arguments of the API function called.

13. The system of claim 8, wherein the behavioral rule corresponds to a verdict which is pronounced upon triggering of the rule, the verdict indicating a category of the malicious behavior corresponding to that behavioral rule.

14. The system of claim 8, wherein the analysis of the file by the processor includes at least one of: a check with the use of the reputation service, a check with the use of one or more YARA rules, or an expert analysis.

15. A non-transitory computer readable medium storing thereon computer executable instructions for updating antivirus applications with antivirus records, including instructions for: analyzing a log of records of API function calls of a file for presence of malicious behavior using one or more behavioral rules; determining that the file is malicious when a behavioral rule corresponding to one or more records of API function calls from the log is identified; extracting from the log the one or more API function calls associated with the identified behavioral rule; determining whether the one or more extracted records of API function calls are supported by an antivirus application of a user device; and when the one or more extracted records of API function calls are not supported by the antivirus application, adding to the antivirus application, a support for registering the unsupported records of API function calls; and creating a new antivirus record comprising the extracted one or more API function calls, a set of hash sums from different segments of the file and rules for selecting the set of hash sums.

16. The non-transitory computer readable medium of claim 15, further comprising instructions for: providing, by the processor, the new antivirus record to the antivirus application.

17. The non-transitory computer readable medium of claim 16, wherein each record of the API functions call log comprises at least an identifier of the API function called, an identifier of the process launched from the file; an identifier of a thread executing instructions of the address space of the process; a set of arguments of the API function called.

* * * * *